United States Patent
Lee

[11] Patent Number: 5,977,816
[45] Date of Patent: Nov. 2, 1999

[54] POSITIVE CHARGE PUMPING CIRCUIT

[75] Inventor: Jong Oh Lee, Kyoungki-do, Rep. of Korea

[73] Assignee: Hyundai Electronics Industries Co., Ltd., Kyoungki-do, Rep. of Korea

[21] Appl. No.: 09/107,289

[22] Filed: Jun. 30, 1998

[30] Foreign Application Priority Data

Jun. 30, 1997 [KR] Rep. of Korea ............... 97-29670

[51] Int. Cl.[6] ............................. G05F 1/10; G05F 3/02
[52] U.S. Cl. .......................... 327/536; 327/589; 363/60
[58] Field of Search .................................. 327/536, 537, 327/306, 157, 589, 590, 390; 363/59, 60; 307/110

[56] References Cited

U.S. PATENT DOCUMENTS

| | | |
|---|---|---|
| 4,621,315 | 11/1986 | Vaughn et al. ............................. 363/60 |
| 5,399,928 | 3/1995 | Lin et al. ................................. 327/365 |
| 5,436,821 | 7/1995 | Inoue ........................................ 363/60 |
| 5,546,031 | 8/1996 | Seesink ................................... 327/155 |
| 5,574,634 | 11/1996 | Parlour et al. ............................ 363/59 |
| 5,801,569 | 9/1998 | Pinkham ................................. 327/333 |
| 5,841,703 | 11/1998 | Wojciechowski .................. 365/189.09 |

*Primary Examiner*—Timothy P. Callahan
*Assistant Examiner*—An T. Luu
*Attorney, Agent, or Firm*—Jacobson, Price, Holman & Stern, PLLC

[57] ABSTRACT

A positive charge pumping circuit which is capable of reducing a sheet resistance and a threshold potential drop. The pumping circuit includes a pumping node, a power supply node, a first diode and at least one pumping stage, The pumping node provides a pumping potential. The supply node provides a power supply potential. An anode of the diode is coupled to the power supply node. The pumping stages are coupled in series between the pumping node and a cathode of the first diode. Each of the pumping stages includes a driving node and a control node, a pumping driving circuit, a transfer control circuit, a charge pumping circuit, and a potential control circuit.

19 Claims, 3 Drawing Sheets

POSITIVE CHARGE PUMPING CIRCUIT

BACKGROUND OF THE INVENTION

The present invention relates to a semiconductor memory device, more particularly to a positive charge pumping circuit for generating a high voltage, for instance 13 volts, using a low power supply voltage, for example 3 volts or 5 volts, in a non-volatile memory device such as flash EEPROM.

Generally, in a semiconductor memory device, if there is required the higher voltage than the power supply voltage VCC which is applied from outside of the semiconductor memory device chip, it should be generated in the chip. For this generating, a positive charge pumping circuit is used.

FIG. 1 is a circuit diagram of a conventional positive charge pumping circuit, through which the prior art and its problem will be explained.

Referring to FIG. 1, the conventional positive charge pumping circuit includes a plurality of MOS transistors 12 and 13, and a plurality of MOS transistors 14 and 15 and it performs a positive pumping from the power supply voltage VCC to the required potential VPP (e.g. 12 volts). For a plurality of MOS transistor 12 and 13, the drain-source paths thereof are coupled in series between the power supply potential VCC and the pumping potential VPP and each is diode-connected where each gate and source thereof is coupled together. Here, the connection nodes between the plurality of MOS transistors 12 and 13 constitutes a plurality of pumping line nodes PN1 and PN2. In the plurality of MOS transistors 14 and 15, each has capacitor-connection, that is, the source and the drain of the transistor 14 or 15 are coupled together, in which the common source/drain is applied with corresponding clock CLK1 or CLK2 and the gate is coupled to corresponding pumping line nodes PN1 or PN2.

However, in this conventional positive charge pumping circuit, since the driving potential as much as the depth of VCC is applied to the driving transistors (that is, the MOS transistors 14 and 15) by the clocks CLK1 and CLK2 which are swung between the power supply potential VCC and the ground, many stages of diode-connected MOS transistors and capacitor-connected MOS transistors are needed to provide the desired potential VPP. This results in that the sheet resistance generated at the respective stages and the respective threshold voltage loss are increased in proportion to the number of the stages, which in turn the efficiency thereof is deteriorated.

In other words, if the VCC is 5 volts and the threshold voltage Vt is 2 volts, while the pumping line nodes PN1 and PN2 are primarily boosted by 5 volts due to the operation of the driving capacitive MOS transistors 14 and 15, only 3-volt boosting is transferred to the next upper stages PN1 and VPP because of the potential-drop of the threshold voltage Vt of the diode MOS transistors 12 and 13. Thus a four stage pumping is required in order to provide the desired 12 volts.

The above-mentioned sheet resistance also causes the problem in that the current transfer speed of the pumping circuit is reduced.

SUMMARY OF THE INVENTION

Accordingly, the object of the present invention is to provide a positive charge pumping circuit capable of reducing a sheet resistance and a threshold potential drop which are factors for deteriorating the pumping efficiency of respective stages, thereby minimizing the number of the pumping stages.

To accomplish the above object of the present invention, there is provided a pumping circuit in a semiconductor device, comprising: a pumping node(VPP) for providing a pumping potential; a power supply node(VCC) for providing a power supply potential; a first diode(MD1) whose anode is coupled to said power supply node; and at least one pumping stage(500) coupled in series between said pumping node(VPP) and a cathode of the first diode(MD1), and wherein each of the pumping stage(500) comprises: a driving node(N1) and a control node(N2); a pumping driving means(400) having at least one second diode(22) and at least one first capacitor(24), wherein an anode-cathode path of the second diode(22) is coupled between the cathode of the first diode(MD1) and the pumping node(VPP), and the first capacitor(24) is coupled between the anode of the second diode(22) and the driving node(N1); a transfer control means(200) coupled between the driving node(N1) and the control node(N2) for providing a forward biasing from the driving node(N1) to the control node(N2); a charge pumping means(300) coupled to the driving node(N1) for providing a pumping potential to the driving node(N1) by a charge pumping operation; and a potential control means(100) coupled to the control node(N2) for alternatively providing a first potential(e.g. the power supply potential VCC) and a second potential(e.g. the ground potential VSS).

According to the preferred embodiment of the present invention, the first diode(MD1) may be a diode-connected NMOS transistor or a diode-connected PMOS transistor. Also, the second diode(22) may be a diode-connected NMOS transistor or a diode-connected PMOS transistor and the first capacitor(24) is a capacitor-connected PMOS transistor.

The charge pumping means comprises a capacitor-connected PMOS transistor(MP31) whose gate is coupled to the driving node(N1) and whose source and drain are commonly coupled and applied with the second clock CLK2. The transfer control means comprises a diode-connected PMOS transistor(MP30) whose source is coupled to the driving node and whose drain and channel are commonly coupled to the control node. The transfer control means may further comprises a gate control diode which may be a diode-connected PMOS transistor(MP21) having a source coupled to the gate of the diode-connected PMOS transistor(MP30), a gate and a drain commonly coupled to a ground node(VSS), and a channel coupled to the power supply node (VCC). The transfer control circuit may further comprises a capacitor-connected PMOS transistor(MP20) which is applied with a clock CLK3.

The potential control means comprises: a pull-up means (110) for periodically pulling up the control node to the power supply potential; and a pull-down means for periodically pulling down the control node to the ground potential. The pull-down means can be composed of a NMOS transistor(MN10) whose source-drain path is coupled between the control node(N2) and the ground node(VSS) and which is applied with a clock CLK2. The potential control means may further comprises a switching element coupled between the control node(N2) and the pull-up means(110) and turned off when the control node is pulled-down. This switching element is composed of a diode-connected PMOS transistor(MP10) whose source-drain path is coupled between the pull-up means and the control node and whose channel is coupled to the pull-up means.

In addition, the pull-up means(110) comprises a switching NMOS transistor(MN11) which is turned on when the control node is pulled-up. The pull-up means may further comprises a diode-connected NMOS transistor(MN12) whose drain and gate are commonly coupled to the power supply node; and a capacitor-connected NMOS transistor (MN13) whose gate is coupled to a gate of the switching NMOS transistor and whose source and drain are commonly coupled and periodically swung between the power supply potential and the ground potential.

BRIEF DESCRIPTION OF THE DRAWINGS

For a more complete understanding of the present invention and the advantage thereof, reference is now made to the following description taken in conjunction with the accompanying drawings in which.

DETAILED DESCRIPTION OF THE PRESENT INVENTION

The preferred embodiment of the present invention will hereinafter be described in detail with reference to the accompanying drawings.

Figure 2:
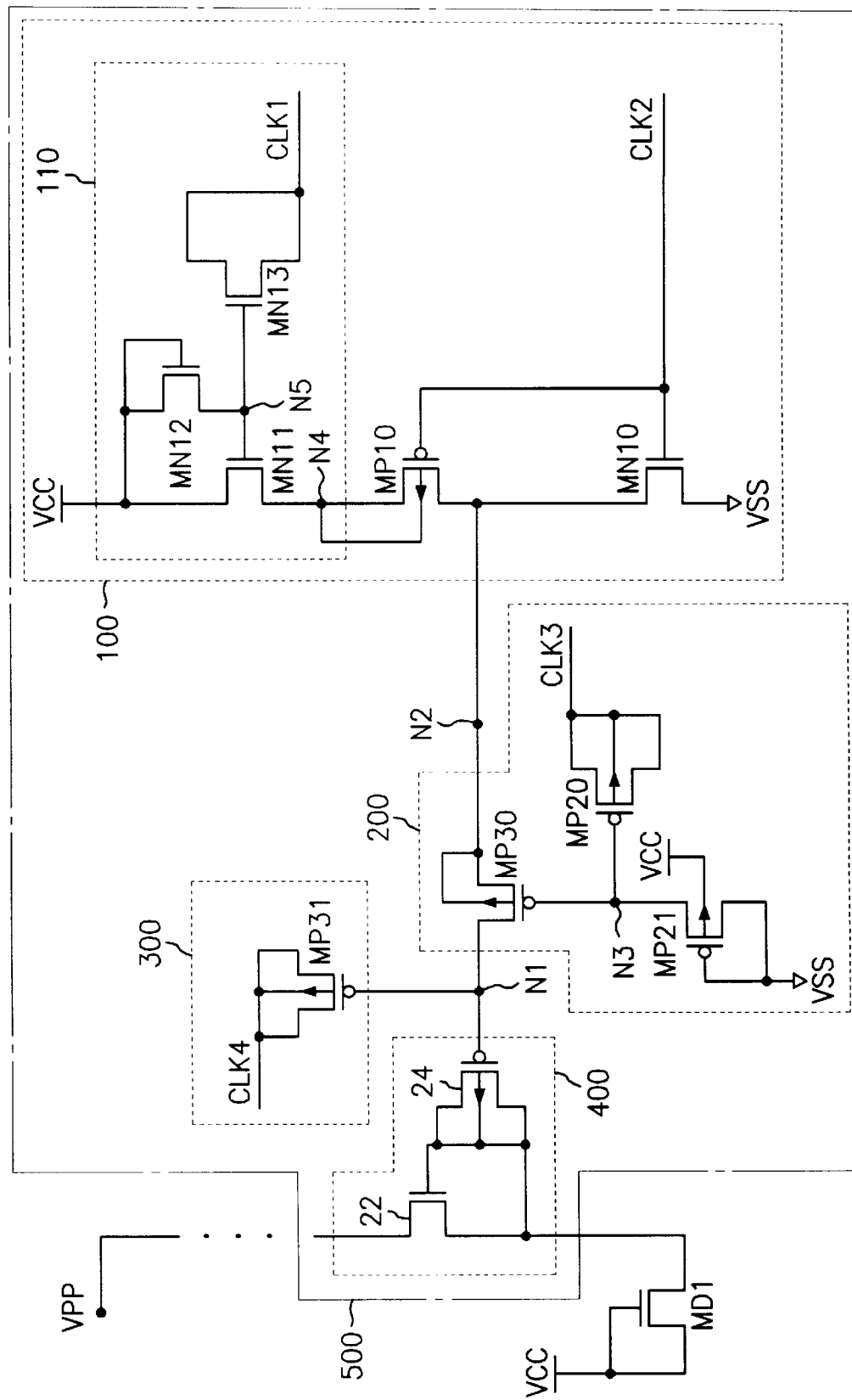
FIG. 2 is a circuit diagram of a positive charge pumping circuit according to one embodiment of the present invention.

FIG. 2 is a positive charge pumping circuit according to one embodiment of the present invention, which comprises a diode MD1 and a plurality of pumping stage 500. Each of the pumping stage 500 comprises a pumping driving unit 400, a potential control unit 100, a transfer control unit 200 and a charge pumping unit 300. The pumping driving unit 400 includes a diode-connected MOS transistor 22 and a capacitor-connected PMOS transistor 24. The drain-source path of the diode-connected MOS transistor 22 is coupled between a pumping node VPP and the source of the diode-connected NMOS transistor MD1. For the capacitor-connected MOS transistor 24, the commonly coupled source/drain thereof is commonly coupled to the gate of the transistor 22 and the source of the transistor MD1, and the gate thereof is coupled to a driving node N1. Here, the capacitor-connected PMOS transistor 24 functions as a diode, which can be substituted by a capacitor-connected NMOS transistor. The potential control unit 100 supplies a power supply potential and a ground potential, and prevents the discharging to the VCC when the potential of the driving node N1 is higher than the power supply potential VCC. The transfer control unit 200 stably transfers the power supply potential and the ground potential supplied from the potential control unit 100 to the driving node N1. In addition, when the driving node N1 is a minus potential, the transfer control unit 200 prevents this potential from transferring to the potential control unit 100. The charge pumping unit 300 amplifies the potential of the driving node N1 using the potential supplied from the potential control unit 100.

In more detail, the potential control unit 100 comprises a pull-up circuit unit 110 for pulling-up the control node N2 to the power supply potential by the control of the external input clock CLK1; a pull-down NMOS transistor MN10 for pulling-down the control node N2 to the ground potential by the control of the external input clock CLK2; and a switching transistor MP10 for cutting off the power supply from the pull-up circuit unit 110, when the control node N2 is pulled-down to the ground potential by the control of the clock CLK2. In other words, the potential control unit 100 functions as a device for providing the VCC potential and the ground potential to the control node N2, which is in turn transferred to the driving node N1 through the transfer control means. Here, the power supply node is coupled to the control node N2 through the NMOS transistor MN11 and the PMOS transistor MP10 when the control node N2 is pulled-up, while the ground potential is coupled to the control node N2 through the NMOS transistor MN10 when the control node N2 is pulled-down. Also, the gate of the transistor MN11 is coupled to the source of the diode-connected NMOS transistor MN12 in order to transfer the power supply potential VCC to the control node N2 without any threshold voltage loss (namely, Vt-loss) of MN11, and is also coupled to the gate of the capacitor-connected NMOS transistor MN13 in order to transfer the power supply potential VCC to the control node N2 without any threshold voltage loss of the transistor MN11. Here, the common drain/gate node of the NMOS transistor, which functions as a diode, is coupled to the power supply potential VCC, and the common drain/source node of the NMOS transistor MN13 which functions as a capacitor, is applied with the external input clock CLK1. In addition, the NMOS transistor MN10 is applied with the external input clock CLK2 through its gate and the PMOS transistor MP10 is applied with the external input clock CLK2 and the substrate(or well) thereof is coupled to the one node N4 of the NMOS transistor MN11. So, the NMOS transistor MN10 prevents the power supply potential from being provided through the NMOS transistor MN11, when the control node N2 is down to the ground potential.

The charge pumping unit 300 comprises a capacitor-connected PMOS transistor MP31 for pumping the potential of the driving node N1, from the power supply potential VCC or the ground potential VSS, to 2VCC or −VCC by charge pumping under the external input clock CLK4. Here, the potential of driving node N1 is affected by the potential of the control node N2 from the potential control unit 100 through the transfer control unit 200. In the capacitor-connected PMOS transistor MP31 is coupled between the input clock CLK4 and the driving node N1.

The transfer control unit 200 comprises PMOS transistors MP20, MP21 and MP30. In the diode-connected PMOS transistor MP30, the gate is coupled to the node N3, the source is coupled to the node N2 and to its channel, and the drain is coupled to the driving node N1. The PMOS transistor MP30 functions as a diode which is forward biased in the direction from the driving node N1 to the control node N2. Thus, when the potential of the control node N2 is higher than that of the driving node N1, the transistor MP30 prevents the current from flowing between the nodes N1 and N2.

The diode-connected PMOS transistor MP21 is coupled between the node N3 and the ground, and controls the node N3 such that the potential of the node N3 is not higher than the threshold voltage of the transistor MP21. Also, The channel of the transistor MP21 is electrically coupled to the power supply voltage VCC.

The capacitor-connected PMOS transistor MP20 is coupled between the input clock CLK3 and the node N3 so as to provide a minus potential to the node N3 when the clock CLK3 becomes the ground potential from the power supply potential. Due to this minus potential of the node N3, the transistor MP30 allows much current to flow from the node N1 to the node N2.

Figure 3:
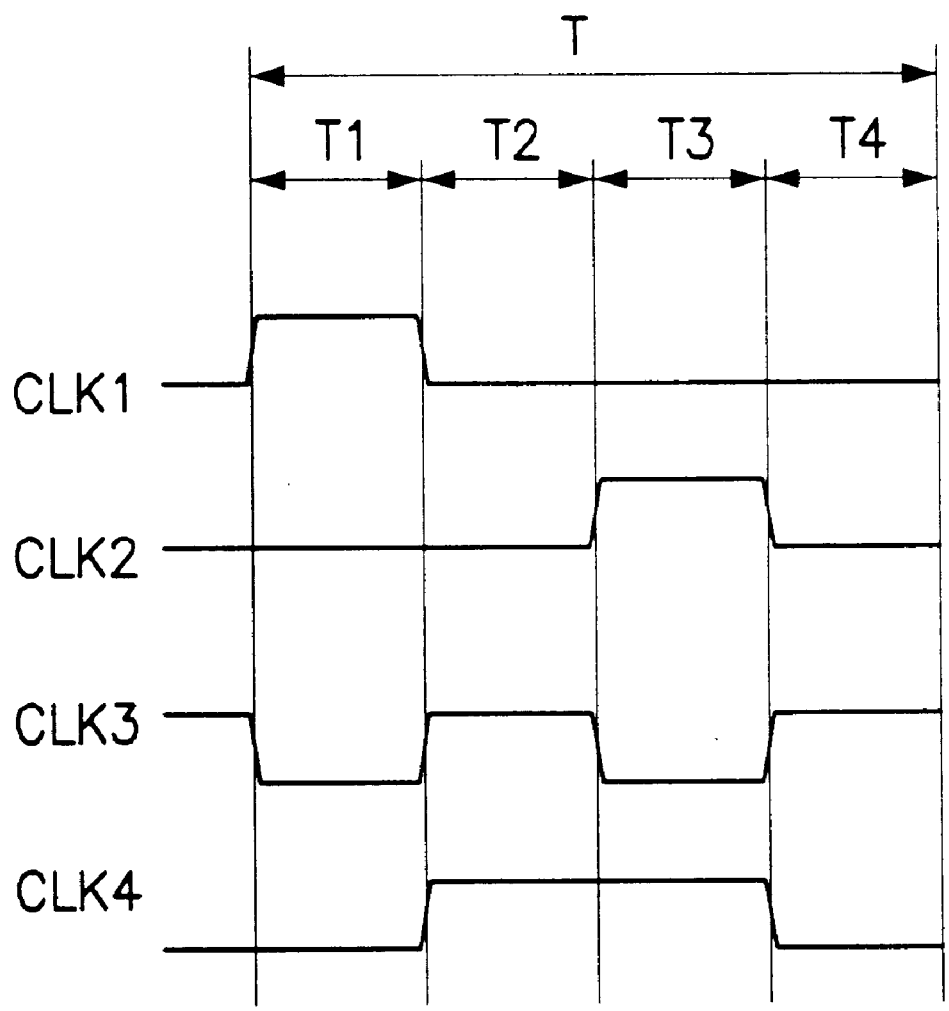
FIG. 3 is a timing chart for illustrating respective clocks of FIG. 2 each being externally applied thereto.

FIG. 3 illustrates the timings of the external input clocks CLK1, CLK2, CLK3 and CLK4.

Referring to FIG. 3, one cycle is composed of periods T1, T2, T3 and T4 and the clocks CLK1, CLK2, CLK3 and CLK4 swing between the power supply potential (which represents a logic "1") and the ground potential (which represents a logic "0").

Also, it is assumed that the external input clocks CLK1, CLK2, CLK3 and CLK4 have logic "0", "0", "1" and "0", respectively, in the initial state.

At the initial state, the node N5 represents the potential (VCC-Vt[MN12]), in which Vt[MN12] is the threshold voltage drop of the NMOS transistor MN12. The potential of the node N4 has the potential (VCC-Vt[MN12]-Vt[MN11]). The gate of the PMOS transistor MP10 is applied with a logic "0" of the clock CLK2, so that the transistor MP10 is turned on. Here, it is assumed that no voltage drop is made by the PMOS transistors MP10 and MP30 when turned on. Since there is no voltage drop between the node N4 and the node N2, the potential of the node N2 is (VCC-Vt[MN12]-Vt[MN11]). The potential of the node N3 is Vt[MP21], where the Vt[MP21] represents the threshold voltage drop of the PMOS transistor MP21. Since the potential of the node N3 corresponds to a logic "0", the PMOS transistor MP30 is turned on, so that the potential of the driving node N1 equals to that of the node N2. In other words, the potential of the driving node N1 is (VCC-Vt[MN12]-Vt[MN11]). Here, it is assumed that all the threshold voltage drop of the PMOS and NMOS transistors are equal to Vt. According to this assumption, the potential of the driving node N1 can be represented by (VCC-2Vt).

During the period T2, the external clocks CLK1, CLK2, CLK3 and CLK4 have logic "1", "0", "0" and "0", respectively. The potentials of the nodes during the period T2 are as follows.

Since the clock CLK1 changes from a logic "0" at the initial state to a logic "1" at the period T1, the potential of the node N5 is affected by the capacitance of the capacitor-connected NMOS transistor MN13 and the capacitance of the NMOS transistor MN11. That is, the potential of the node N5 is as follow.

$$V5[T1] = \frac{C13}{(C11 + C13)} VCC + VCC - Vt$$

Wherein "V5[T1]" represents the potential of the node N5 at the first period T1, "C13" and "C11" represent the capacitance of the NMOS transistor MN13 and the capacitance of the NMOS transistor MN11, respectively. Here, the fabrication dimensions of the transistors MN11 and MN13 are preferably controlled such that the value of {C13/(C11+C13)}*VCC is greater than 2Vt.

The potential V5 of the node N5 corresponds to a logic "1", thereby turning on the NMOS transistor MN11. Here, it is assumed that the voltage drop of the NMOS transistor MN11 is zero when it is turned on. Thus, the potential of the node N4 equals to the power supply potential VCC. Since the clock CLK2 is still a logic "0", the PMOS transistor MP10 is turned on and the potential of the node N2 equals to that of the node N4. In other words, the potential of the node N2 equals to the power supply potential VCC.

In the meantime, the external input clock CLK3 changes from a logic "1" at the initial state to a logic "0" at the period T1. So the potential of the node N3 at the period T1, is as follow.

$$V3[T1] = Vt - \frac{C30}{(C30 + C20)} VCC$$

Wherein "V3[T1]" represents the potential of the node N3 at the first period T1, "C30" and "C20" represent the capacitances of the transistors MP20 and MP30, respectively. Also, the fabrication dimensions of the transistors MP20 and MP30 are preferably controlled such that the value of C20/(C30+C20)*VCC is larger than 2Vt. The potential V3[T1] as above makes the PMOS transistor MP30 turned on, so that the potential of the node N2 is transferred to the driving node N1 without any voltage drop. That is, the potential of the driving node N1 equals to the power supply potential VCC.

Next, during the second period T2, the external input clocks CLK1, CLK2, CLK3 and CLK4 are logic "0", "0", "1" and "1".

The clock CLK4 changes from a logic "0" to a logic "1", so that the potential of the driving node N1 is pumped from a VCC to the following.

$$V1[T2] = VCC + \frac{C31}{(C31 + C24)} VCC$$

Here, it is assumed that the capacitances of the PMOS transistors MP10 and MP30 are much smaller than those of the capacitor-connected PMOS transistors MP31 and MP24.

Wherein "V1[T2]" represents the potential of the driving node N1 at the second period T2, "C31" and "C24" represent the capacitance of the transistors MP31 and MP24, respectively. In addition, since the clock CLK3 changes back to a logic "1", the potential of the node N3 equals to Vt, thereby turning on the PMOS transistor MP30. Therefore, the potential of the node N2 equals to the potential of the driving node N1.

That is, the potential of the control node N2 is equal to the following:

$$V2[T2] = VCC + \frac{C31}{(C31 + C24)} VCC$$

Wherein "V2[T2]" represents the potential of the node N2 at the second period T2. The external clock CLK2 is also a logic "0" so that the PMOS transistor MP10 is turned on. Therefore, the potential of the node N4 is equal to that of the node N2.

That is, the potential of the node N4 at the second period T2 is as follows.

$$V4[T2] = VCC + \frac{C31}{(C31 + C24)} VCC$$

In addition, since the external clock CLK1 is a logic "0", the potential of the node N5 equals to (VCC-Vt). Therefore, the potential of the node N4 is isolated from the power supply potential by the NMOS transistor MN11 and also isolated from the ground potential by the NMOS transistor MN10.

At the third period T3, the external input clocks CLK1, CLK2, CLK3 and CLK4 are logic "0", "1", "0" and "1", respectively.

Since the clock CLK2 is a logic "1" (that is a VCC level), the NMOS transistor MN10 is turned on, so that the potential of the node N2 is equal to the ground level. The potential of the gate of the transistor MP10 is also a VCC level by the clock CLK2, so that the transistor MP10 is turned off. Therefore, the potential of the node N4 is isolated from the that of the node N2. The potential of the node N4 is determined to (VCC-2Vt) based on the potential of the node N5 and the threshold voltage drop of the transistor MN11.

In the meantime, since the clock CLK3 is a ground level, the potential of the node N3 is determined to the following equation based on the ratio of the capacitance of the transistor MN20 to the capacitance of the transistor MN30.

$$V3[T3] = Vt - \frac{C24}{(C30 + C20)} VCC$$

Wherein "V3[T3]" represents the potential of the node N3 at the period T3.

This potential of the node N3 makes the PMOS transistor MP30 turned on, so that the potential of the driving node N1 is equal to that of the node N2 which is a ground level.

At the fourth period T4, the external input clocks CLK1, CLK2, CLK3 and CLK4 are logic "0", "0", "1" and "0", respectively. Since the clock CLK3 is a VCC level, the potential of the node N3 becomes Vt level. Alternatively, the clock CLK4 is a ground level, the potential of the node 1 is:

$$V1[T4] = -\frac{C31}{(C31 + C24)} VCC$$

Wherein "V1[T4]" represents the potential of the node N1 at the fourth period T4 and "C31" and "C24" represent the capacitances of the transistors MP31 and MP24, respectively. At this time, if the capacitance C24 is much smaller in comparison with the capacitance C31, V1[T4] approximately reaches to -VCC. Since the potential of the node N3 is Vt level, the potential of the node 2 is the same with that of the node N1.

In addition, the potential of the well of the transistor MP30 is equal to the potential of the node N2 and the potential of the node N2 doesn't change from the third period T3 and maintains the ground level.

Figure 1:
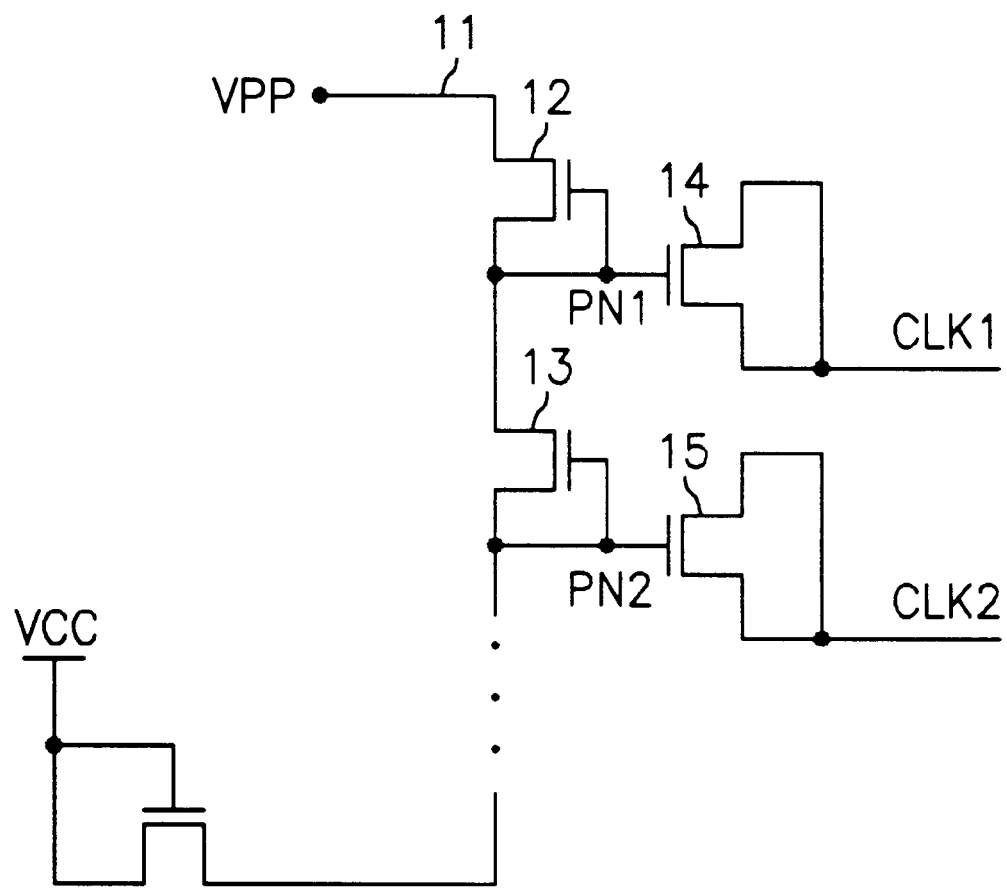
FIG. 1 is a circuit diagram of a conventional positive charge pumping circuit.

In FIG. 1, since the clocks CLK1 and CLK2 have the ground level, the gate potential of the transistor MP10 is the ground level. So, the transistor MP10 is turned on, so that the potential of the node N2 and the potential of the node N4 are the same with each other.

As described above, the potential of the node N1 is a VCC level at the first period T1, an approximately 2VCC level at the second period T2, a ground level at the third period T3, and a -VCC at the fourth period T4. To be summarized, the potential of the driving node N1 is capable of swing between 2VCC and -VCC, in which the swing depth of the node N1 reaches 3VCC. Accordingly, in case the power supply potential VCC is 5 volts and the threshold voltage Vt is 2 volts, only one pumping stage is required for providing a 12 volt boosting potential VPP, in which one pumping stage is composed of a capacitor-connected MOS transistor 24 and a diode-connected MOS transistor 22.

As mentioned above, the present invention makes it possible to reduce the number of pumping stages, by increasing the potential of the driving node N1, which results in reducing the sheet resistance and the threshold voltage drop aggravating the pumping efficiency. In other words, according to the present invention, the number of pumping stages can be reduced to ⅓ of that in the prior art, for providing the same pumping potential, when "VCC" is 5 volts. Also, when the power supply potential VCC is 3 volts, the present invention is capable of providing the same pumping efficiency with that realized by the prior art using 5 volts as the VCC, with the same area being used.

Although preferred embodiments of the present invention has been illustrated and described, various alternatives, modifications and equivalents may be used. Therefore, the foregoing description should not be taken as limiting the scope of the present invention which is defined by the appended claims.

What is claimed is:

1. A pumping circuit in a semiconductor device, comprising:

a pumping node for providing a pumping potential;

a power supply node for providing a power supply potential;

a first diode whose anode is coupled to said power supply node; and at least one pumping stage coupled in series between said pumping node and a cathode of said first diode, wherein each of said pumping stage comprises:

a driving node and a control node;

a pumping driving means having at least one second diode and at least one first capacitor, wherein an anode-cathode path of said second diode is coupled between the cathode of said first diode and said pumping node, and said first capacitor is coupled between the anode of said second diode and said driving node;

a transfer control means coupled between said driving node and said control node for providing a forward biasing from said driving to said control node;

a charge pumping means coupled to said driving node for providing a pumping potential to said driving node by a charge pumping operation; and a potential control means coupled to said control node for alternatively providing a first potential and a second potential to the control node.

2. A pumping circuit according to claim 1, wherein said first diode is a diode-connected NMOS transistor whose drain and gate are commonly coupled to the power supply node and whose source is coupled to said pumping stage.

3. A pumping circuit according to claim 1, wherein said first diode is a diode-connected PMOS transistor whose source is coupled to the power supply node and whose drain and gate are commonly coupled to said pumping stage.

4. A pumping circuit according to claim 1, wherein the second diode of said pumping driving means is a diode-connected NMOS transistor.

5. A pumping circuit according to claim 1, wherein the second diode of said pumping driving means is a diode-connected PMOS transistor.

6. A pumping circuit according to claim 1, wherein said first capacitor is a capacitor-connected PMOS transistor whose gate is coupled to the driving node and whose source and drain are commonly coupled to an anode of the second diode.

7. A pumping circuit according to claim 1, wherein said charge pumping means comprises a second capacitor whose one end is coupled to the driving node.

8. A pumping circuit according to claim 7, wherein said second capacitor is a capacitor-connected PMOS transistor whose gate is coupled to the driving node and whose source and drain are commonly coupled.

9. A pumping circuit according to claim 1, wherein the first potential and the second potential are a power supply potential and a ground potential, respectively.

10. A pumping circuit according to claim 9, wherein said transfer control means comprises a third diode whose anode is coupled to the driving node and whose cathode is coupled to the control node.

11. A pumping circuit according to claim 10, wherein said third diode is a first diode-connected PMOS transistor whose source is coupled to the driving node and whose drain and channel are commonly coupled to the control node; and wherein said transfer control means further comprises a gate control diode coupled to a gate of the first diode-connected PMOS transistor.

12. A pumping circuit according to claim 11, wherein said gate control diode is a second diode-connected PMOS transistor having a source coupled to the gate of the first diode-connected PMOS transistor, a gate and a drain commonly coupled to a ground potential node, and a channel coupled to the power supply node.

13. A pumping circuit according to claim 12, wherein said transfer control circuit further comprises a capacitor-connected PMOS transistor coupled to the gate of the first diode-connected PMOS transistor.

14. A pumping circuit according to claim 9, wherein said potential control means comprises:

a pull-up means for periodically pulling up the control node to the power supply potential; and a pull-down means for periodically pulling down the control node to the ground potential.

15. A pumping circuit according to claim 14, wherein said pull-down means is a NMOS transistor whose source-drain path is coupled between the control node and the ground potential node.

16. A pumping circuit according to claim 14, wherein said potential control means further comprises a switching element coupled between the control node and the pull-up means and turned off when the control node is pulled-down.

17. A pumping circuit according to claim 16, wherein said switching element is a diode-connected PMOS transistor coupled whose source-drain path is coupled between the pull-up means and the control node and whose channel is coupled to the pull-up means.

18. A pumping circuit according to claim 14, wherein said pull-up means comprises a switching NMOS transistor turned on so as to supply the power potential to the control node when the control node is pulled-up.

19. A pumping circuit according to claim 18, wherein said pull-up means further comprises:

a diode-connected NMOS transistor whose drain and gate are commonly coupled to the power supply node; and a capacitor-connected NMOS transistor whose gate is coupled to a gate of the switching NMOS transistor and whose source and drain are commonly coupled and periodically swung between the power supply potential and the ground potential.

* * * * *